(12) United States Patent
Cervantes et al.

(10) Patent No.: US 6,538,433 B1
(45) Date of Patent: Mar. 25, 2003

(54) METHOD AND APPARATUS FOR NON-CONTACT MEASURING OF METAL BED PARAMETERS

(75) Inventors: Michel Cervantes, Luleå (SE); Christer Enström, Nyköping (SE); Håkan Kelvesjö, Borlänge (SE); Willy Ohlsson, Nyköping (SE)

(73) Assignee: MPC Metal Process Control AB, Nyköping (SE)

( * ) Notice: Subject to any disclaimer, the term of this patent is extended or adjusted under 35 U.S.C. 154(b) by 0 days.

(21) Appl. No.: 09/937,303
(22) PCT Filed: Mar. 24, 2000
(86) PCT No.: PCT/SE00/00587
§ 371 (c)(1),
(2), (4) Date: Oct. 30, 2001
(87) PCT Pub. No.: WO00/58695
PCT Pub. Date: Oct. 5, 2000

(30) Foreign Application Priority Data

Mar. 25, 1999 (SE) ................................. 9901103

(51) Int. Cl.⁷ ............................. G01P 3/50; G01B 7/14; G01R 33/12; G01F 1/56
(52) U.S. Cl. ................. 324/228; 324/164; 324/207.13; 324/226; 324/229; 324/235; 73/861.08; 73/861.75; 73/514.39
(58) Field of Search ................................ 324/226–229, 324/235, 239–243, 207.13–207.25, 164, 165, 204; 73/861.08, 861.11, 861.71, 861.74–861.76, 519.01, 514.39

(56) References Cited

U.S. PATENT DOCUMENTS

| 2,435,043 A | 1/1948 | Lehde et al. |
| 3,595,076 A | 7/1971 | Eyges |
| 4,144,756 A | 3/1979 | Linder |
| 4,255,976 A | 3/1981 | Formato |
| 4,380,924 A | 4/1983 | Nakamoto et al. |
| 4,866,383 A * | 9/1989 | Taliaferro ................... 324/228 |
| 6,064,201 A * | 5/2000 | Cha et al. ................... 324/228 |

FOREIGN PATENT DOCUMENTS

| EP | 0 150 670 A2 | 8/1985 |
| JP | 2216016 | 12/1999 |
| JP | 57-199917 A | 12/1999 |

OTHER PUBLICATIONS

Kolesnikov et al., "Measurement Methods and Properties of Anisotropic Flows Excited by Bulk Force", *Inst. of Phys., Acad. of Sci.*, Salaspils, Latvia (Conference: 1997) pp. 228–235.

* cited by examiner

Primary Examiner—Gerard R. Strecker
(74) Attorney, Agent, or Firm—Burns, Doane, Swecker & Mathis, L.L.P.

(57) ABSTRACT

In a method and device for measuring at least one parameter of a metal bed, measuring is obtained by a magnetic field being generated from one side of the metal bed so that eddy currents are generated in the metal bed as the metal bed moves relative to the magnetic field. The metal bed and the magnetic field are made to move relative to one another. A force related to the eddy currents affects a body and the action of the force on the body is detected by a detecting device, the detected force being a function of a desired parameter of the metal bed.

32 Claims, 12 Drawing Sheets

A-A

B-B

C-C

METHOD AND APPARATUS FOR NON-CONTACT MEASURING OF METAL BED PARAMETERS

FIELD OF THE INVENTION

The present invention relates to a method and device for measuring at least one parameter of a metal bed. By the term "metal bed" is meant metal in solid as well as liquid form. The term comprises arbitrary shapes of the bed and, thus, it is not limited to comprise an elongated web.

TECHNICAL BACKGROUND

In the industry, essentially the metallurgical industry, there is a great need for devices for measuring parameters, such as speed, of a metal bed in motion, for example, when controlling the metal flow in continuous casting or the stirring speed in a chill mould.

A device for measuring the speed of a molten metal is known from U.S. Pat. No. 4,144,756. According to this publication, the device comprises one coil which generates a magnetic field and two coils which have a receiving function. When the molten metal flows past the magnetic field producing coil, the charges in the molten metal sense a lorentz force, which gives rise to an eddy current that generates a second, or induced, magnetic field. The other coils receive the induced magnetic field and give rise to a signal via a circuitry, the signal being proportional to the speed of the molten metal. A drawback of the known device is, however, its fairly complicated design which has many components and that it is not reliable enough as regards ambient, disturbing fields, if any, which makes the device difficult to use. Another drawback is that the direction of motion of the metal flow cannot be determined by the device without the aid of other devices.

JP 57-199917 is included in Patent Abstracts of Japan and discloses an electromagnetic fluxmeter for molten metal. The fluxmeter comprises an annular, wound coil which is arranged circumferentially on a tube, in which metal flows. A magnetic field is generated by the annular, circumferential coil, whereby lines of flux parallel to the metal bed are formed. The magnetic field gives rise to eddy currents in the molten metal. A force which is related to the eddy currents affects the coil in the downstream direction of the metal flow. The circumferential coil on the tube is supplied with four load sensors which are relatively offset at an angle of 90°. The load sensors are used to measure the force which affects the circumferential coil, the force being proportional to the flow rate. A drawback of this prior-art construction is that it is very limited as regards possible fields of application, it is bulky and lacks the desired flexibility.

SUMMARY OF THE INVENTION

An object of the invention is to eliminate the problems of prior-art techniques by providing a method for measuring at least one parameter, such as the speed or the direction of motion, of a metal bed, the method being simple and reliable.

Another object of the invention is to provide a device for measuring at least one parameter of the metal bed, the device being simple, small and easy to handle.

Yet another object of the invention is to provide a device which is durable and which is easy to adapt to various applications and environmental conditions thereof.

The above-mentioned objects are achieved according to the invention by a method and a device which have the features defined in the accompanying claims.

According to the present invention, the problem of measuring a parameter of a metal bed is tackled in a new way by using a technique which, unlike the known electromagnetic detection, uses "mechanical" detection instead.

The invention is based on the knowledge that great flexibility and liberty of placing can be achieved by measuring from only one side of the metal bed. Nor is one bound to special dimensions of the metal bed but, on the contrary, the invention may advantageously be used for measuring on many different types of metal beds.

According to a first aspect of the present invention, a method is thus provided for contactless measuring of at least one parameter of a metal bed, the method comprising the steps of:

generating a magnetic field so that eddy currents are generated in the metal bed as the metal bed moves relative to the magnetic field, which is generated from only one side of the metal bed;

making the metal bed and the magnetic field move relative to one another;

adapting a means in connection with the metal bed so that it is subjected to the action of the force which is related to the eddy currents;

detecting the action of the force, which is induced by the eddy currents, on said means; and determining the parameter of the metal bed on the basis of the detected force which is a function of the parameter.

According to another aspect of the present invention, a device is provided for contactless measuring of at least one parameter of a metal bed, the device comprising first means for generating a magnetic field so that eddy currents are generated in the metal bed as the metal bed and said first means move relative to each other, said first means being adapted to generate the magnetic field from only one side of the metal bed;

second means which interact with the eddy currents and are arranged so that they are affected by a force which is related to the eddy currents; and third means which are adapted to detect the action of the force on said second means, the detected force being a function of the desired parameter of the metal bed.

The device thus has a non-circumferential configuration and is designed to be placed on an optional side of the metal bed. Naturally, this gives a great possibility of selecting a measuring point and also of varying the distance to the metal bed.

The desired parameter may be any parameter that can affect the generated eddy currents and, thus, the force. Some examples of parameters are the speed of the metal bed as regards size or direction, the distance to the surface of the metal bed, the thickness or conductivity of the metal bed, or a combination thereof. Thanks to the device being placed on only one side of the metal bed, and preferably with such a suspension that its general extension is transversely of, preferably substantially perpendicular to, the metal bed, motions in all directions in the plane of the metal bed can be detected.

The device for measuring a parameter of a metal bed according to the present invention comprises first means for generating a magnetic field so that parameter-dependent eddy currents are generated in the metal bed as the metal bed moves relative to said first means. Said first means are conveniently adapted in such a manner that the generated magnetic field is directed towards, preferably substantially perpendicular to, the metal bed. In other words, the central lines of flux are preferably substantially perpendicular to the metal bed. Said first means may comprise one or more permanent magnets, one or more electromagnets with an iron core and/or a powder core, or a combination of permanent magnet(s) and electromagnet(s). A permanent magnet is preferably arranged so that the axis which is defined by the north pole and the south pole is substantially perpendicular to the metal bed. In the case of an electromagnet, the axis of the coil is preferably directed perpendicular to the metal bed.

The device further comprises second means which interact with the eddy currents and are adapted in such a manner that they are affected by a force which is related to the eddy currents. Preferably, the main direction of the generated magnetic field forms a substantially right angle to the direction of said force which affects said second means. Said second means comprise, for example, a magnet which is arranged on a pendulum or is included in a pendulum, magnets which are arranged on a wheel or are included in a wheel, or a fixedly attached element, in which stress arises under the action of the force.

The device also comprises third means which are adapted to detect the action of the force on said second means, the detected force being a function of the desired parameter of the metal bed. Said third means comprise, for example, Hall sensors, double-pulse lasers, strain gauges, pressure gauges, hydraulic or pneumatic means, magneto-resistive pulse sensors, optical pulse counters or ultrasonic devices.

Said first, second and third means are preferably all enclosed in a casing that belongs to the device, which, when measuring, is placed in a contactless manner on one side of the metal bed. The term "one side" naturally comprises that the measuring is carried out from above, below, diagonally from the metal bed, or either side thereof, etc. In a Cartesian system of coordinates, the device preferably has one single main direction towards the metal bed.

According to a preferred embodiment of the present invention, said second means comprise a body which is adapted to be affected by a force so that bending or angling, preferably a pendulum swing, of said body is achieved. Thanks to the design of the device, which means that measuring is carried out from only one side, it is possible to obtain a great swing caused by said action of the force by using an elongated body.

According to another preferred embodiment of the invention, said second means comprise a body which is fixedly attached to or suspended from the device. Said third means are adapted to detect mechanical stress in the body which is caused by the force, the means being adapted to measure the stress which is a function of the induced force. Said third means can be strain gauges arranged on the body, the resistance of the strain gauges being changed as a result of the deflection of (stress on) the body. By arranging, for instance, two or more gauges round the body, also the direction of motion can be determined, apart from the speed of the metal bed. Naturally, other types of gauges may also be used, such as pressure gauges, piezoelectric gauges, hydraulic or pneumatic means.

According to yet another preferred embodiment of the invention, said second means comprise a body which is movably attached to or suspended from the device in such a manner that it moves under the action of the induced force. Such a movably arranged body may, for instance, be a suspended pendulum that comprises a magnet, said third means being adapted to measure the pendulum swing which is a function of the induced force. In order to minimise the resistance to the pendulum motion, the swing arm of the pendulum can be suspended from a point, such as from a tip. The force which is induced by the eddy currents strives to make the swing arm follow the direction of motion of the metal bed, which makes it possible to measure, for instance, both the speed and the direction. Another alternative is to suspend the swing arm cardanically. Yet another variant is to suspend the swing arm from an edge, which thus limits the indication of direction to one plane. Preferably, such a suspension is therefore turnable in order to make it possible to find a maximum swing and, thus, both the speed and the direction of motion.

In another embodiment according to the invention, said second means are directly or indirectly adapted to flow in a medium with higher density than air, for instance, a low viscosity fluid. The advantage of this embodiment is that the weight of said second means is smaller in such a medium, which results in the inertia of motion also being smaller. When using such a medium, a greater swing or deflection is thus obtained as regards the same action of the force than in the case without a medium, the swing or deflection also being more easily detected by said third means. Said second means may, for instance, comprise a float which encloses a magnet.

According to yet another embodiment, the body may be supplied with magnets, which are actuatable by a force, and rotatably arranged so that it rotates as a result of the action on the magnets as a consequence of the induced currents, said third means, for instance pulse counters, being adapted to measure the speed of rotation which is a function of the induced force. The rotatably arranged body may, for example, have the shape of a wheel with a wheel hub which is attached to a suspended link arm. The wheel is preferably arranged to rotate in planes that are perpendicular to the plane of the metal bed. In order to find the maximum speed of rotation (and thus both the speed and the direction of the metal bed), the wheel is preferably turnably and self-adjustingly suspended. Also other embodiments of rotatable bodies are conceivable, more or less symmetric, for instance, in the form of a sphere or a polygon.

Said first and second means can be arranged separately from each other or be connected to each other. They may also be part of a common unit, such as a permanent magnet in the form of a suspended pendulum. In this case, the pendulum, which is arranged for measuring from one side of the metal bed, generates a magnetic field which induces eddy currents, and moreover is affected by the force induced by the eddy currents. The advantage of constructing said first and second means connected to each other or in a common unit is that the device will be less bulky and easier to handle. It should be noted that the term "a common unit" also comprises the variant where said first and second means are one and the same means.

It has turned out to be advantageous to use Hall sensors as said third means when said second means comprise a movably attached body. A Hall sensor is essentially a conductor or a semi-conductor in which an electric current flows. When the sensor is subjected to a magnetic field that is perpendicular to the direction of current, a difference of potential appears across the sensor in a direction which is perpendicular to both the direction of current and the magnetic field. This so-called Hall voltage is directly proportional to the magnetic flux density. When the movably attached body thus changes position, for example, a pendulum comprising a magnet (i.e. the position of the magnet changes), then also the Hall voltage across the sensor changes, whereby the swing and, thus, the desired parameter can be measured.

It has also turned out to be advantageous to use one or more lasers as said third means. An advantage of using lasers is that the detection of the action of the force on said second means takes place in a contactless manner. Another advantage is that they can be used in connection with both a fixedly attached body and a movably attached body. For instance, holographic interferometry with a double-pulse laser may be used as light source. This means that said second means are subjected to double exposure at different instants of time. Between the exposures said second means undergo a change, such as a pendulum swing or bending. When the image of the double-exposed means has been reconstructed and the holographic interferogram is examined, a pattern of interference fringes will be visible. From this pattern, the change of the means between the two exposures can be determined. The reading of the pattern can, for instance, be made by a CCD camera.

The device according to the present invention has a limited, space-saving design and can be used in various technical fields. Its use in the metallurgical industry is particularly advantageous, which may comprise fields of application such as measuring speed and/or direction of the motion of a metal surface in a chill mould during casting. The non-circumferential device according to the invention can also be used for measuring the motion of a metal surface in various process containers, for example, the tundish in the manufacture of steel and metal, metal that flows in a duct, pipe or the like. The device is then placed by the side of the metal bed and, because of this assymmetrical measuring method, it can easily be re-arranged. It is also possible to measure on a medium having electric characteristics, for example, slurry of iron ore, a suspension of a metal, the motion of a metal in the surface of another material or the motion of a solid material which is exposed to processing, such as a band, a rod or the like.

A measuring signal which is obtained according to the invention can be used for systems that are utilised for controlling units which affect the speed of the metal bed, such as control of: magnetic brakes in a chill mould in casting, an agitator in casting, the speed of belts in process lines, rotating shafts, flow rate in casting or the reference level in a chill mould in casting to optimise the metal flow in the chill mould.

An advantage of the device according to the present invention is its "built-in" vibration absorption. When vibrations, if any, appear, which in prior-art technique constituted a great disturbance, they will generate a counterforce in the device, the counterforce neutralising the vibrations, whereby the device will be self-absorbing.

Another advantage of the invention is that the measuring takes place in a contactless manner. Thus, the metal bed is not affected by the device, which is non-enclosing, that is, placed on one side of the metal bed, in any other way than by the magnetic field which is generated for the purpose of measuring and the resulting counterforce in the metal bed. The fact that the device is placed only on one side of the metal bed gives a great possibility of choosing the position in the longitudinal direction and/or vertical direction in which the measuring is to be carried out. It is also very easy to move or remove the device entirely without risking that it interferes with the metal bed. The device is, for example, particularly suitable for measuring in a chill mould since there is a possibility of getting very close to the metal.

If a constant magnetic field is generated by the device according to the invention, the detected force varies with the distance of the device to the surface. It may thus be advantageous to control the distance to the surface to be able to measure correct values of the speed and the direction of motion of the metal bed. This means that vice versa, when the motion of the metal bed is known, the distance can be determined instead.

According to an advantageous embodiment of the invention, the device which is separated from the metal bed comprises means for measuring both the motion of the metal bed and the distance thereto.

The invention has so far been described in connection with a moving metal bed. Those skilled in the art realise that, of course, it can also be used on a non-moving metal bed if one wishes to measure on the moving device instead, when, for instance, scanning the device above or beside the metal bed. The inventive device can thus be used in connection with a relative motion between the metal bed and the device.

DETAILED DESCRIPTION OF PREFERRED EMBODIMENTS OF THE INVENTION

Figure 1:
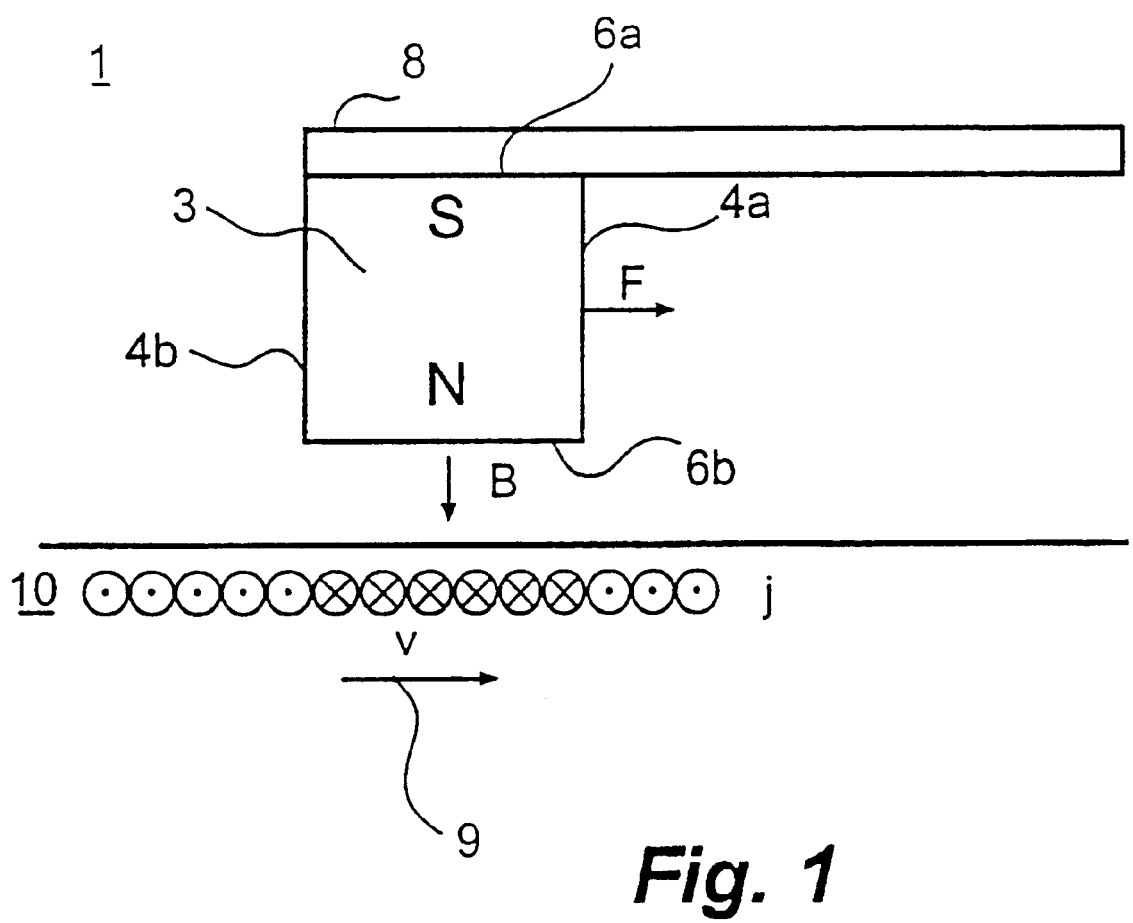
FIG. 1 schematically illustrates the physical principle on which the present invention is based.

FIG. 1 shows the physical principle on which the present invention is based. a simple device 1 comprises a permanent magnet 3. The permanent magnet 3 has two long sides 4a and 4b and two short sizes 6a and 6b. One short side 6a is attached to a holder 8 so that a vertical attachment is contained, the short side 6a being located vertically above the short side 6b. The permanent magnet in the example has a north pole N at the short side 6b and a south pole S at the short side 6a. The device 1 is placed above a metal bed 10 which moves at the speed v in the direction of the arrow 9. The design and relative lateral arrangement of the device result in the magnetic flux lines being directed substantially perpendicular to the metal bed 10. When the metal bed 10 is subjected to a magnetic field B which is generated by the magnet 3, the charges in the metal bed 10 will sense a lorentz force, which gives rise to eddy currents j in the surface. The eddy currents j, in their turn, give rise to a counterforce F which affects the magnet 3 and which strives to "pull along" the magnet 3 in the direction of motion of the metal bed 10. The main direction of the generated magnet field B is, as illustrated in the figure, not only perpendicular to the metal bed 10, but also to the direction of the force F.

Figure 2:
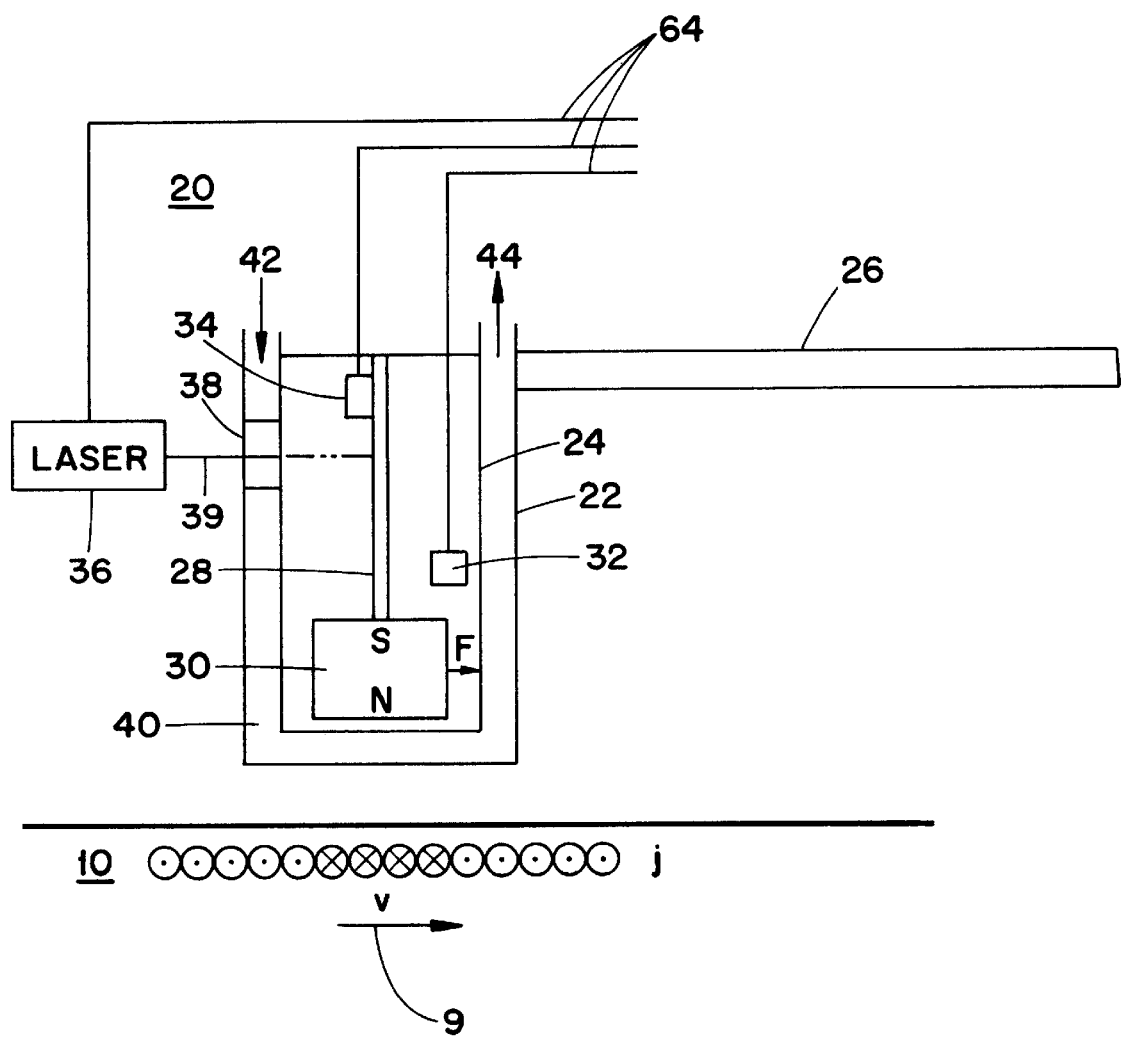
FIG. 2 schematically illustrates the principle of the present invention.

FIG. 2 schematically illustrates a basic device 20 according to the present invention. The device 20 comprises an elongated, cylindrical external casing 22 and a similar internal casing 24 which is concentric therewith. The casings 22, 24 consist of non-magnetic material, such as ceramic material, glass or stainless steel. The external casing 22 is connected to a holder 26 so that the envelope surface of the casing 22 is vertically arranged. The internal casing 24 encloses a body 28 which is fixedly or movably attached at the top, in the form of a pea or a swing arm, the lower part of which is supplied with a magnet 30. The device 20 is placed above, that is, not round, a moving metal bed 10. When the metal bed 10 is exposed to a magnetic field which is generated by the magnet 30, eddy currents j are induced in the metal bed, the magnet 30 being affected by a force F which strives to "pull along" the magnet 30 in the direction of motion of the metal bed 10 according to the principle in FIG. 1. To measure this action of the force F on the magnet 30, different types of force detecting means can be arranged. In the figure three examples of such means are essentially illustrated. In the case of a body 28, such as a swing arm, which is movably attached at the top, it is advantageous to use Hall sensors 32 near the magnet 30, the course of operation of the sensors having already been described. If, on the contrary, the body 28 is fixedly attached, the force detection may, for instance, take place by strain gauges 34 which are arranged on the body 28, the strain gauges detecting the mechanical stress that arises in the body 28 under the action of the force F on the magnet 30. The strain gauges 34 are conveniently placed high up on the body 28 (at a great distance from the magnet) where the deflection and the stress are at their maximum. In both cases it is also possible to use, somewhere by the side of the body 28 or the magnet 30, optical detecting means 36, such as lasers, for instance double-pulse lasers, which have already been described. In this case, the casings are supplied with windows 38 through which the laser light 39 can travel. Irrespective of what force detecting means 32, 34, 36 is used, an output signal is sent from the force detecting means via a signal line 64 to a signal-processing evaluation unit (not shown). When the device is used in a high-temperature environment, for instance in connection with measuring on molten metal, the equipment needs to be cooled to maintain a satisfying accuracy of measurement. Between the external casing 22 and the internal casing 24 there is thus a passage 40 with an inlet 42 and an outlet 44, to which passage 40 a refrigerant can be supplied to cause the desired cooling.

Figure 3A:
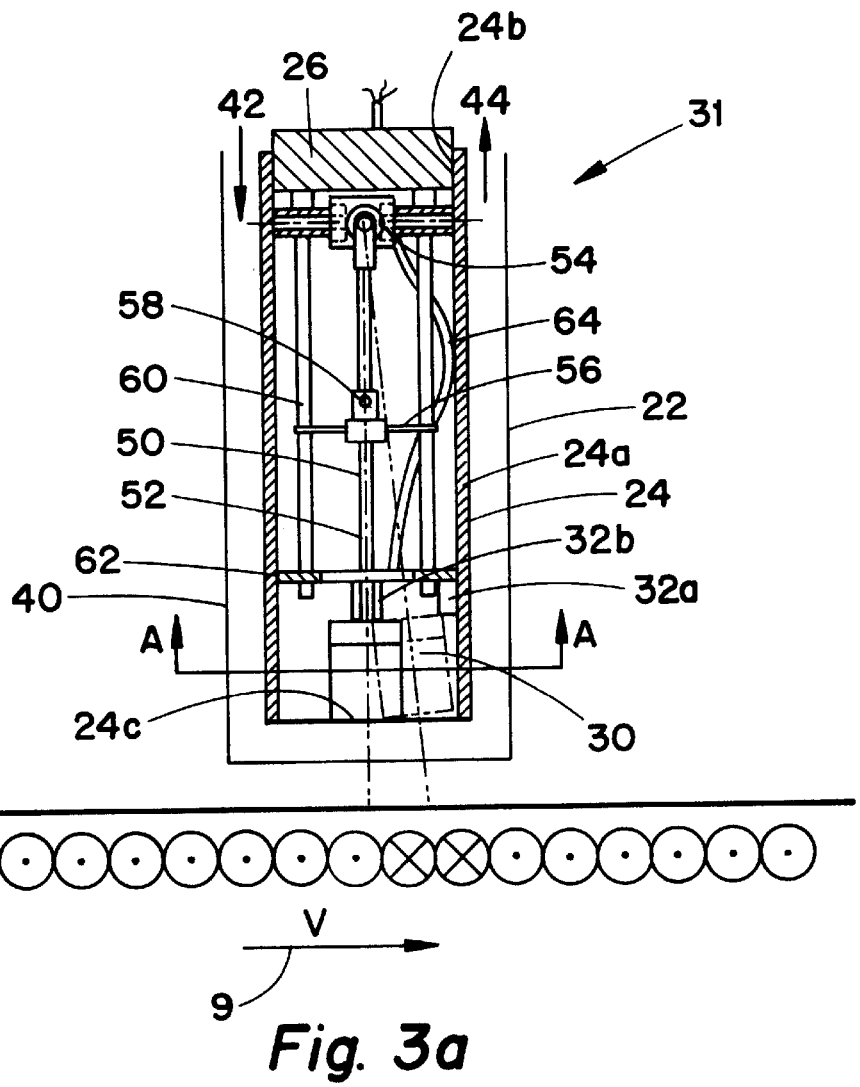
FIGS. 3a–b schematically show a device according to an embodiment of the invention.
Figure 3B:
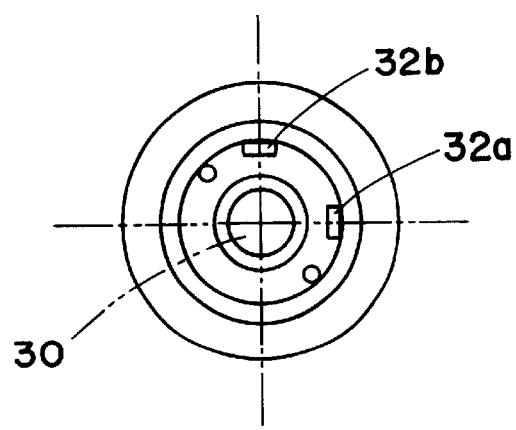

FIG. 3a shows in more detail a device 31 according to an embodiment of the invention. The device 31 comprises an elongated, cylindrical internal casing 24. The casing 24 has a cylinder wall 24a and two end walls 24b,c. One end wall 24b is attached to a holder 26, so that a vertical attachment is obtained, the end wall 24b being located vertically above the other end wall 24c. The casing 24 encloses a pendulum 50 with a swing arm 52 and a pendulum body in the form of a magnet 30. One end of the swing arm 52 is movably attached near the upper end wall 24b of the casing 24 in a ball bearing cardanic suspension 54, the function of which will be further explained in the following, and on the other end of the swing arm 52, the magnet 30 is mounted in the vicinity of the lower end wall 24c of the casing 24. Dampening means 56 for dampening and slowing down the pendulum motions and in this example comprising elastic elements are at one end attached to a fixing element 58 which is movably arranged on the swing arm 52 at some distance from the ends of the arm. The dampening means 56 are, moreover, at their other end movably attached to rods 60 which are parallel to the cylinder wall 24a of the casing 24, whereby the dampening is variable by means of the vertical movability of the dampening means 56. Detecting means 32a and 32b are arranged above the magnet 30 on a printed circuit card 62, which is attached to the cylinder wall 24a. The respective arrangement of the detecting means 32a,b in the horizontal plane is illustrated in FIG. 3b which shows a cross-section along the line A—A in FIG. 3a. The aim of the detecting means 32a,b is to detect pendulum swings, which will be described in the following as well as the purpose of the printed circuit card 62. The device 31 is when measuring placed above a metal bed 10 which moves at the speed v in the direction of the arrow 9, that is, horizontally. When the metal bed 10 is exposed to a magnetic field which is generated by the magnet 30, eddy currents j are induced in the metal bed, the magnet 30 being affected by a force which strives to "pull along" the magnet 30 in the direction of motion of the metal bed 10 according to the principle in FIG. 1. As regards the device 31 in FIG. 3a, this results in a pendulum swing, in which the pendulum in the swinging position is illustrated by dashed lines. In connection with the swing in this example, the swing arm 52 is at a shorter distance than before from the cylinder wall 24a and the detecting means 32a. In this example the detecting means 32a,b comprise magnetic field detecting means in the form of Hall sensors, which have turned out to be especially advantageous in this context and the courses of operation of which have already been described. The purpose of the printed circuit card 62 is to keep the sensors in place, but it may also be adapted to conduct current to and from the sensors. The magnetic flux density which affects the sensors will be changed when the position of the magnet 30 is changed in relation to the sensors, the difference of potential (Hall voltage) across the sensors being changed. The change of the Hall voltage is an output signal which is sent via a signal line 64 from the printed circuit card 62 for processing, so that values of the desired parameters are obtained. In the embodiment a ball bearing cardanic suspension 54 has been shown, which means that it allows pendulum motions in all vertical planes. Thus, the direction of the swing of the pendulum 50 will coincide with the direction of motion of the metal bed 10. Because of the arrangment of the Hall sensors 32a,b, which is shown in the cross-sectional view in FIG. 3b, the pendulum motions in all vertical planes can be detected. Calibration calculations of this detection are carried out by means of FIGS. 11 and 12.

A Hall sensor measures the distance between the magnet and the Hall sensor. When the device is calibrated according to the present invention in a horizontal direction, for instance against a force $F_x$ which acts in the X-direction, a ratio is obtained between the average speed of the metal bed, the distance between the magnet and the surface of the metal bed, and the Hall voltage. The Hall voltage is proportional to the distance x between the magnet and the Hall sensor (see FIG. 11). The distance x increases as the speed of the metal bed decreases and/or the distance between the magnet and the surface of the metal bed increases.

Figure 11:
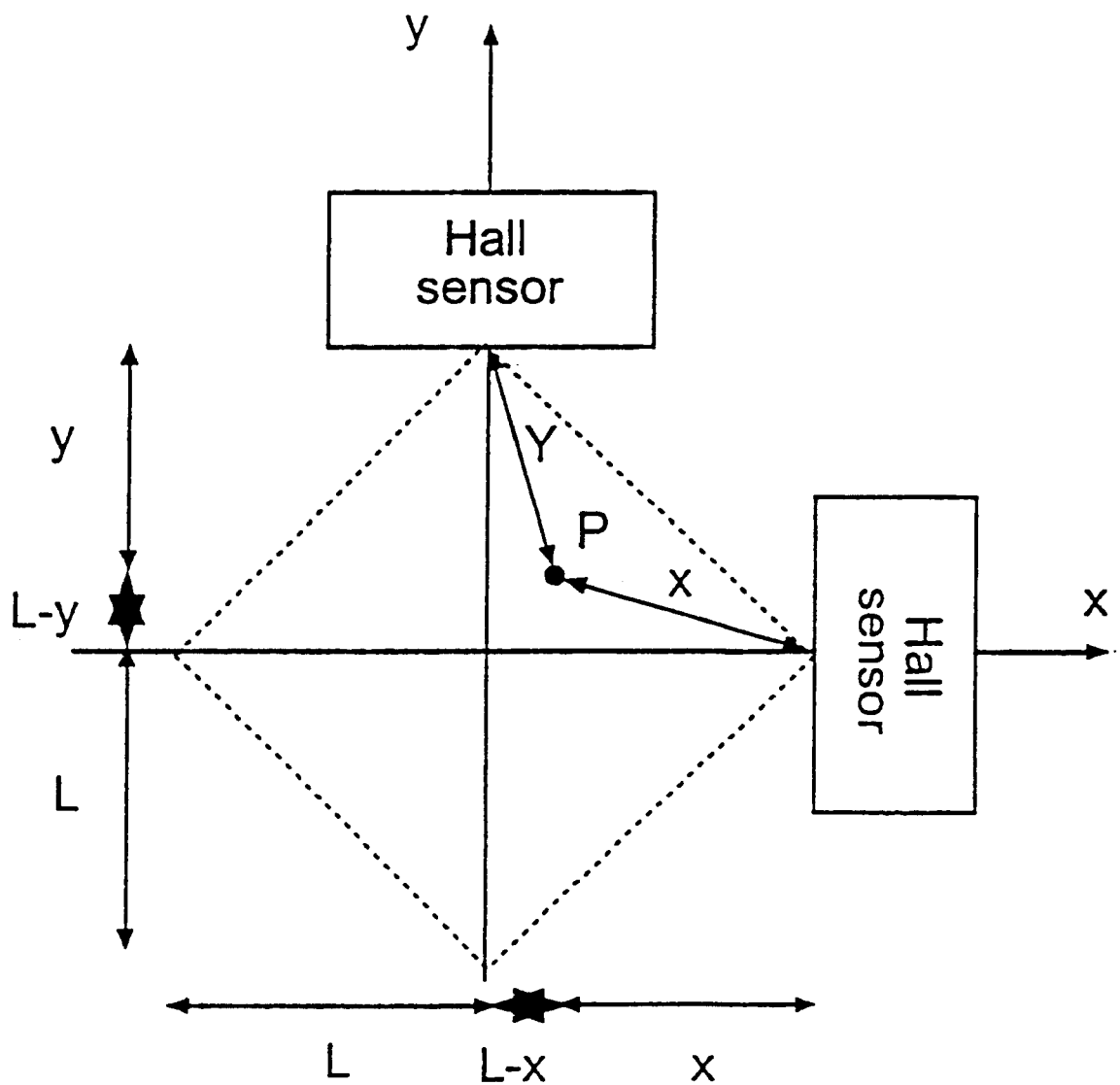
FIG. 11 shows a schematic diagram of two Hall sensors, the diagram being used for calibration calculation of a device according to the invention.

FIG. 11 schematically shows the allowed, square range of motion of the magnet 30 in FIG. 3, L being the distance between the magnet at rest (no action of the force) and any one of the Hall sensors, x being the distance between the Hall sensor placed in the X-direction and the magnet when only a force $F_x$ acts on the magnet, y being the distance between the Hall sensor placed in the Y-direction and the magnet when only a force $F_y$ acts on the magnet, X being the distance between the Hall sensor which is placed in the X-direction and the magnet when the forces $F_x$ and $F_y$ act simultaneously on the magnet, and Y being the distance between the Hall sensor which is placed in the Y-direction and the magnet when the forces $F_x$ and $F_y$ act simultaneously on the magnet.

Measuring of the two speeds in the horizontal plane thus means a displacement of the magnet in both the X-direction and Y-direction to a position P. The following calculations take place with the assumption of the magnet being capable of moving only within the allowed area. The Hall sensors measure the distances X and Y. There is no direct connection between X, Y, the average speed of the metal bed and the distance between the magnet and the surface of the metal bed. When using the Pythagorean theorem, the following ratio between x, y, X and Y is, however, obtained:

$$\begin{cases} X^2 = x^2 + (L-y)^2 \\ Y^2 = y^2 + (L-x)^2 \end{cases}$$

If x and y are solved as functions of X and Y, the calibration of one dimension can be used. After some calculation steps, the following is obtained:

$$\begin{cases} x_1 = x = \left(\frac{2L^2 - Y^2 + X^2}{4L}\right) + \sqrt{\left(\frac{Y^2}{2} - \left(\frac{2L^2 + Y^2 - X^2}{4L}\right)^2\right)} \\ x_2 = L - y = \left(\frac{2L^2 - Y^2 + X^2}{4L}\right) - \sqrt{\left(\frac{Y^2}{2} - \left(\frac{2L^2 + Y^2 - X^2}{4L}\right)^2\right)} \\ y_1 = y = \left(\frac{2L^2 + Y^2 - X^2}{4L}\right) + \sqrt{\left(\frac{Y^2}{2} - \left(\frac{2L^2 + Y^2 - X^2}{4L}\right)^2\right)} \\ y_2 = L - x = \left(\frac{2L^2 + Y^2 - X^2}{4L}\right) - \sqrt{\left(\frac{Y^2}{2} - \left(\frac{2L^2 + Y^2 - X^2}{4L}\right)^2\right)} \end{cases}$$

Thanks to the symmetry above, the calibration of the device is necessary only in one direction.

Figure 12:
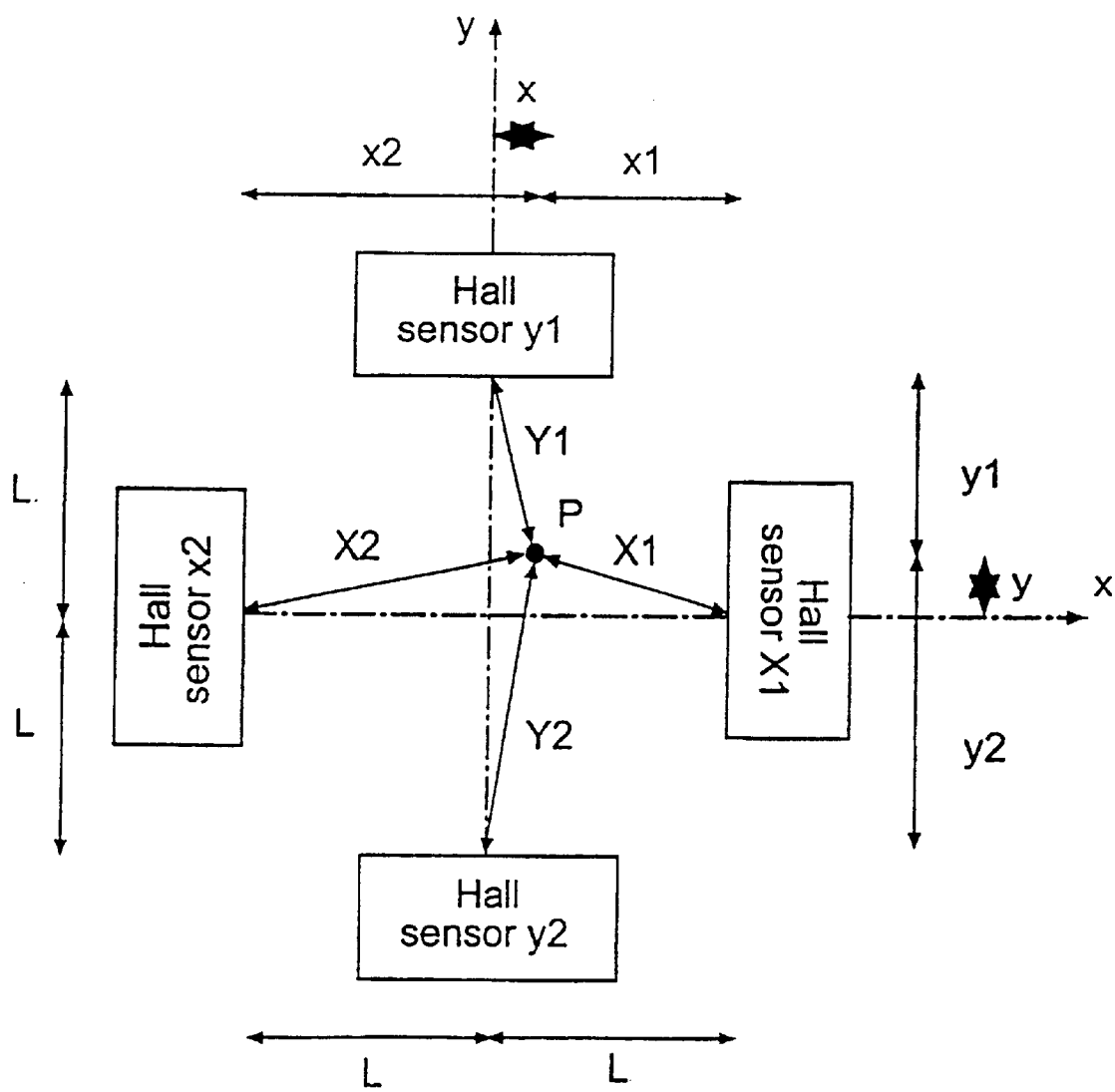
FIG. 12 shows a schematic diagram of four Hall sensors, the diagram being used for calibration calculation of a device according to the invention.

It is, of course, also possible to use several Hall sensors, for instance 4 sensors, as is shown in FIG. 12. In this case, the Hall voltage is proportional to the distance x=(x2-x1)/2, if the device is calibrated in the X-direction. It should be noted that x in FIG. 12 corresponds to L-x in FIG. 11. In FIG. 12 the absolute value of the distance x decreases when the speed of the metal bed decreases and/or the distance between the magnet and the surface of the metal bed increases.

In the figure the range of motion of the magnet is schematically shown,

L being the distance between the magnet at rest (no action of the force) and any one of the Hall sensors, x1 being the distance between the Hall sensor x1 placed in the X-direction and the magnet when only a force $F_x$ acts on the magnet, x2 being the distance between the Hall sensor x2 placed in the X-direction and the magnet when only a force $F_x$ acts on the magnet, y1 being the distance between the Hall sensor y1 placed in the Y-direction and the magnet when only a force $F_y$ acts on the magnet, y2 being the distance between the Hall sensor y2 placed in the Y-direction and the magnet when only a force $F_y$ acts on the magnet, X1 being the distance between the Hall sensor x1 placed in the X-direction and the magnet when the forces $F_x$ and $F_y$ act simultaneously on the magnet, X2 being the distance between the Hall sensor x2 placed in the X-direction and the magnet when the forces $F_x$ and $F_y$ act simultaneously on the magnet, Y1 being the distance between the Hall sensor y1 placed in the Y-direction and the magnet when the forces act $F_x$ and $F_y$ act simultaneously on the magnet, Y2 being the distance between the Hall sensor y2 which is placed in the Y-direction and the magnet when the forces $F_x$ and $F_y$ act simultaneously on the magnet, x being the distance in the X-direction between the magnet at rest (no action of the force) and its position in position P (action of the force), and y being the distance in the Y-direction between the magnet at rest (no action of the force) and its position in position P (action of the force).

The following ratio is obtained between x1, x2, y1, y2, X1, X2, Y1 and Y2:

$$\begin{cases} x1 + x2 = 2L \\ y1 + y2 = 2L \end{cases} \quad \begin{cases} x2 - x1 = 2x \\ y2 - y1 = 2y \end{cases}$$

$$\begin{cases} X1^2 = (L-x)^2 + y^2 \\ X2^2 = (L+x)^2 + y^2 \\ Y1^2 = x^2 + (L-y)^2 \\ Y2^2 = x^2 + (L+y)^2 \end{cases} \quad \begin{cases} X2 - X1 = X \\ Y2 - Y1 = Y \end{cases}$$

If x and y are solved as functions of X and Y, the calibration of one dimension can be used. After a few calculation steps the following is obtained:

$$\begin{cases} x = \dfrac{X2^2 - X1^2}{4L} = \dfrac{X(X + 2X1)}{4L} \\ y = \dfrac{Y2^2 - Y1^2}{4L} = \dfrac{Y(Y + 2Y1)}{4L} \end{cases}$$

Thanks to the symmetry above, calibration of the device is also in this case necessary in one direction only.

Reverting to the device 31 in FIG. 3a, also this device is provided with a casing 22 for cooling of the device. The external casing 22 and the internal casing 24 form a passage 40 between them with an inlet 42 and an outlet 44, a refrigerant flowing through the passage 40.

In the example shown above, a ball bearing cardanic suspension has been used for the suspension of the pendulum. Naturally, it is also possible to use another type of suspension, such as a point or an edge. A point has the advantage of further reducing the friction. An edge limits the indication of direction to one plane, the swing arm being preferably turnably suspended (turnable edge) in order to find a maximum swing.

Figure 4A:
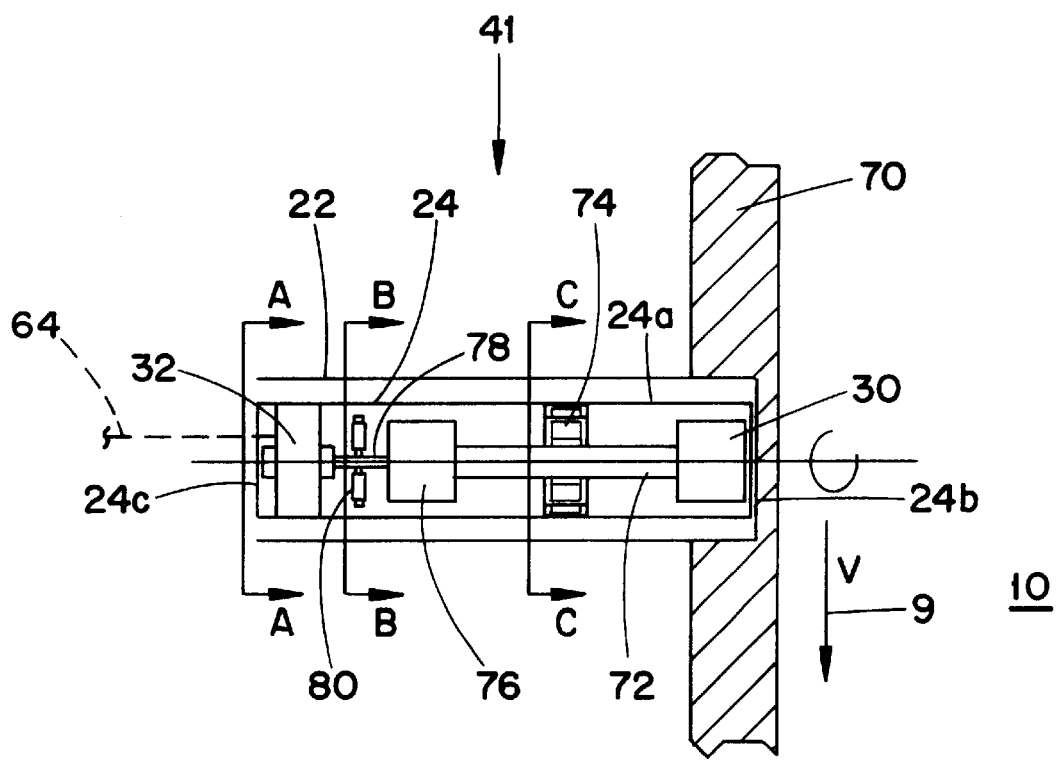
FIGS. 4a–d schematically show an embodiment of a device according to the invention, the device being arranged in a chill mould wall.
Figure 4B:
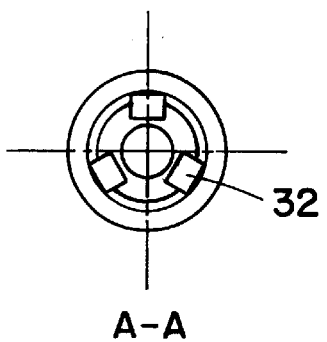
Figure 4C:
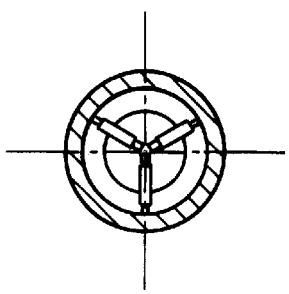
Figure 4D:
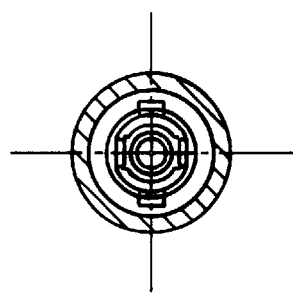

FIG. 4a shows a device 41 according to another embodiment of the invention. The device 41 comprises an elongated, cylindrical internal casing 24. The casing 24 has a cylinder wall 24a and two end walls 24b,c. One end wall 24*b* is fixed in a chill mould wall 70, so that a horizontal attachment is obtained. The other end wall 24*c* is freely located outside the chill mould wall 70. The casing 24 encloses a balancing rod (balancing pendulum) 72, the length of which extends from the attached end 24*b* of the casing 24 to ¾ of the length of the casing 24. The middle portion of the balancing rod 72 is enclosed by and movably attached to a multiaxial bearing 74 which results in the ends of the balancing rod being movable in all planes. The bearing 74 (shown in cross-section in FIG. 4*d*) is, in its turn, fixedly attached to the cylinder wall 24*a* of the casing 24. At the end of the balancing rod 72 which is located at the attached end 24*b* of the casing 24, a permanent magnet 30 is arranged. A balance weight 76 is arranged at the other end of the balancing rod 72 and serves to counteract the weight of the magnet 30, whereby the balancing rod 72 is kept in a horizontal position when no other forces affect it. At the end of the balancing rod 72, at which the balance weight 76 is arranged, a magnetic peg 78 is also attached, extending horizontally towards the free end wall 24*c* of the casing 24. In the vicinity of the free end wall 24*c*, detecting means 32, in this example in the form of Hall sensors, are arranged, round the peg 78 for detecting the motions of the peg 78, which follow the motions of the balancing rod 72. Between the detecting means 32, which are shown in FIG. 4*b* in cross-section, and the balance weight 76, dampening means 80, in this example in the form of springs that are attached to the cylinder wall 24*a*, are arranged round the peg 78, which is shown in FIG. 4*c* in cross-section. The dampening means 80 are adapted to dampen and slow down the swing of the peg 78.

In FIG. 4*a* the device is placed with one end 24*b* in a chill mould wall 70. On the other side of the chill mould wall 70, molten metal 10 moves at the speed v in the direction of the arrow 9. The device is thus in its extension directed towards the molten metal 10 from one side thereof. When the molten metal 10 is exposed to a magnetic field which is generated by the magnet 30, the magnet 30 will be affected by a force which strives to "pull along" the magnet 30 in the direction of motion of the metal 10 according to the principle in FIG. 1. As regards the device 41 in FIG. 4*a*, this results in the balancing rod 72 moving from its initial position and, thus, also the same thing happens to the magnetic peg 78 which is attached to the balancing rod 72. In connection with a swing, the magnetic peg 78 thus is located at another distance from the detecting means 32 (Hall sensors) than before. The magnetic field extending through the sensors will be changed when the position of the peg 78 is changed. This change of signal is sent via a signal line 64 for processing so that the values of the desired parameters are obtained. Also in this embodiment, an external casing 22 is arranged for the purpose of cooling.

Those skilled in the art realise that, instead of Hall sensors, other force detecting means may be used, such as optical sensors, for example laser. In such cases, the peg is non-magnetic. An advantageous variant of this is shown in more detail in FIG. 10.

Figure 10:
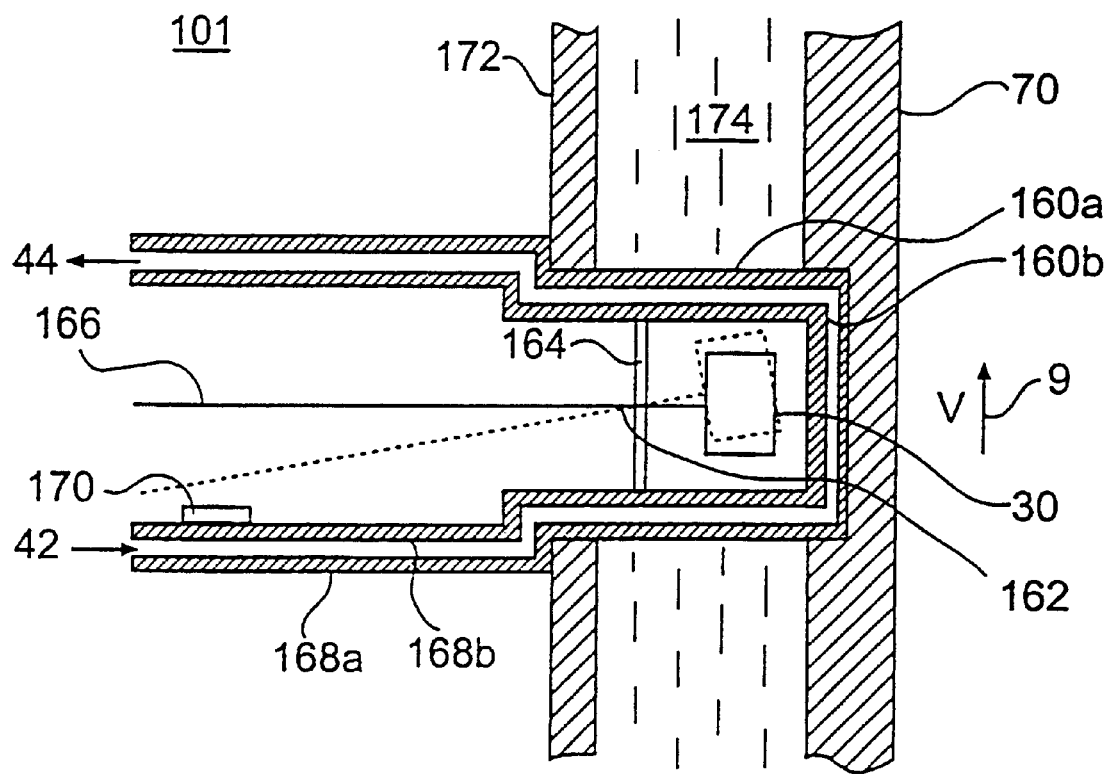
FIG. 10 schematically shows an embodiment of a device according to the invention, the device being arranged in a chill mould wall.

FIG. 10 shows a device 101 according to the invention very schematically. As the device 41 in FIG. 4*a*, the present device 101 is fixed in a chill mould wall 70. The device comprises an elongated, cylindrical external casing 160*a* and an internal casing 160*b*. One end of the external casing 160*a* is fixed in the chill mould wall 70.

The casings 160*a*, 160*b* enclose a rod 162 whose one end is movably suspended from a suspension means 164. At the other end of the rod 162 (at the attached end of the casing 160*a*), a magnet 30 is arranged. At the suspended end of the rod 162, a long peg 166 is arranged, which extends away from the chill mould wall 70, in the extension of the rod 162, out of the casings 160*a*, 160*b* and into a box with double walls 168*a*, 168*b*. According to previous examples, the double walls 168*a*, 168*b* of the box together with the casings 160*a*, 160*b* thus form a passage for cooling the device 101, the passage having an inlet 42 for refrigerants and an outlet 44. As in the example in FIG. 4*a*, molten metal 10 moves on the other side of the chill mould wall 70 at the speed v in the direction of the arrow 9, which results in the magnet 30 being "pulled along" in the direction of motion of the metal 10 according to the principle in FIG. 1. Consequently, the rod 162 moves from its initial position and, thus, the same thing also happens to the long peg 166. Owing to the fact that the peg is long, a greater swing is obtained, which results in the swings being more distinct and thus easier to detect. This greater swing is made possible since the device needs to measure from only one side of the metal bed, not in a circumferential configuration. A position of swing is shown in FIG. 10 by dashed lines. Consequently, detecting means 170 are arranged, seen from the chill mould wall 70, at the farther end of the peg, at which the swing is easiest to detect. Suitable detecting means 170 are optical devices for distance measuring, which can be arranged on the wall 168*b* of the box. The figure also shows an external wall 172 arranged round the chill mould. In the space between the external wall 172 and the chill mould wall 70, there is a cooling liquid 174 for cooling the chill mould. As in the device in FIG. 4, a balance weight (not shown) can be arranged, the purpose of which is to counteract the weight of the magnet 30, whereby the rod 162 and the long peg 166 are kept in a horizontal position when not affected by other forces.

Figure 5A:
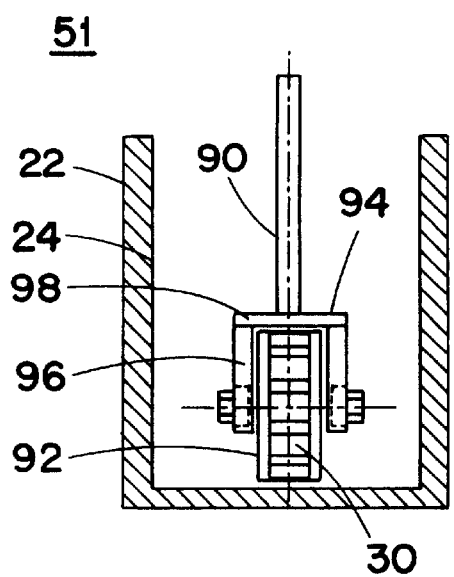
FIGS. 5a–b show a detail of the device according to yet another embodiment of the invention.
Figure 5B:
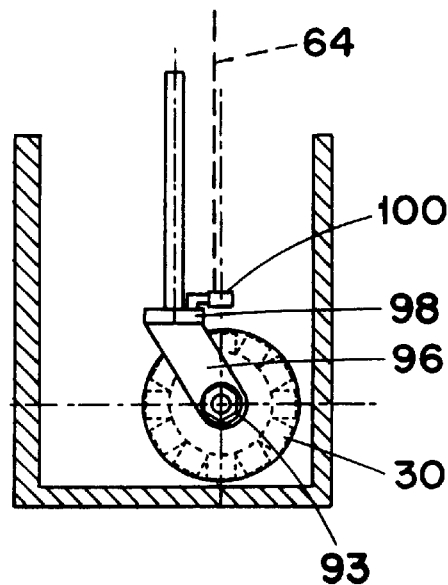

FIGS. 5*a* and 5*b* are a top view and side view, respectively, of a detail of a device 51 according to yet another embodiment of the invention, the detail being arranged in a manner similar to the pendulum in the double casing 22, 24 in FIG. 3. In this example the swing arm and the body of the pendulum correspond to a fixedly attached arm 90 and a link wheel 92, respectively. One end of the arm 90 is fixedly attached (not shown) in the vicinity of the upper end wall of the casing 22, 24, and at the other end of the arm 90, near the lower end wall of the casing, a link wheel 92 is arranged in a yoke 94 having two parts 96 and 98 according to prior-art technique. The lower part 96 of the yoke 94 engages on both sides of the wheel 92 in the hub 93, round which the wheel 92 is rotatable. Furthermore, the lower part 96 of the yoke 94 is turnably articulated to the upper part 98 (not shown). Magnets 30 are arranged along the periphery of the wheel 92. For instance, all the magnets 30 have their south pole directed towards the centre of the wheel 92. It is, however, evident to those skilled in the art that the poles just as well can be arranged reversely, that is, with all the north poles directed towards the centre. When measuring, the device is as in FIG. 3 placed above a moving metal bed (not shown). In the present example, the magnets 30 generate the magnetic field and they will also be affected by the force which strives to "pull along" the magnets 30 in the direction of motion of the metal bed. This results in the wheel 92 being made to rotate and, moreover, adjusting to the direction of motion of the metal bed since the lower part 96 of the yoke 94 is turnably articulated to the upper part 98. Adjacent to the wheel 92, detecting means 100 for detecting the speed of the wheel are arranged (FIG. 5*b*). It has been found especially advantageous to use optical pulse counters as detecting means 100. From these means, a signal is sent via a signal line 64 for processing, so that values of the desired parameters are obtained.

Figure 6:
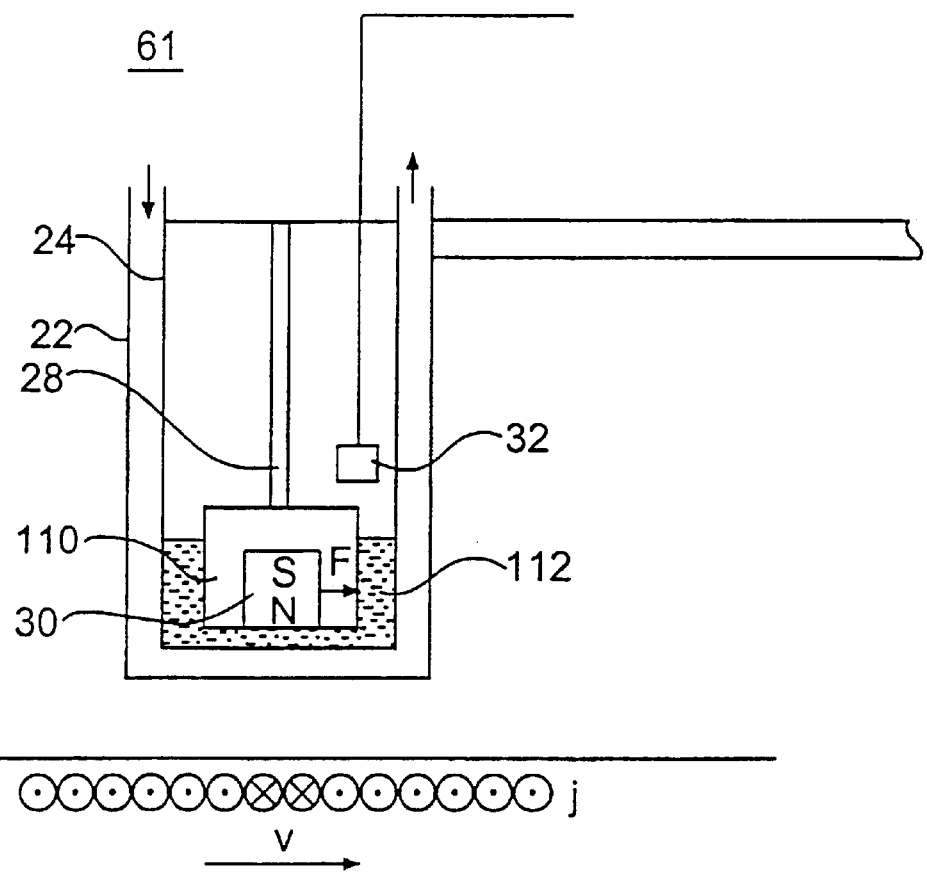
FIG. 6 schematically shows the principle of reducing the weight of a magnet in a device according to the invention.

FIG. 6 schematically shows the principle of reducing the weight of a magnet 30 in a device 61 according to the invention. A body 28, such as a swing arm, which is fixed in the double casing 22, 24, is at its lower end provided with a float 110 which at least partly is positioned in a medium 112 having a higher density than air, for example a fluid. A magnet 30 is arranged inside the float 110. The weight of the magnet 30 (and the float 110) is smaller thanks to the float 110 floating in the medium 112, which means that also the inertia of motion is smaller. Thus, for the same action of the force, a greater swing is obtained than in the case where such a medium 112 is not used, the swing also being easier to detect by the detecting means 32, such as Hall sensors.

Figure 7A:
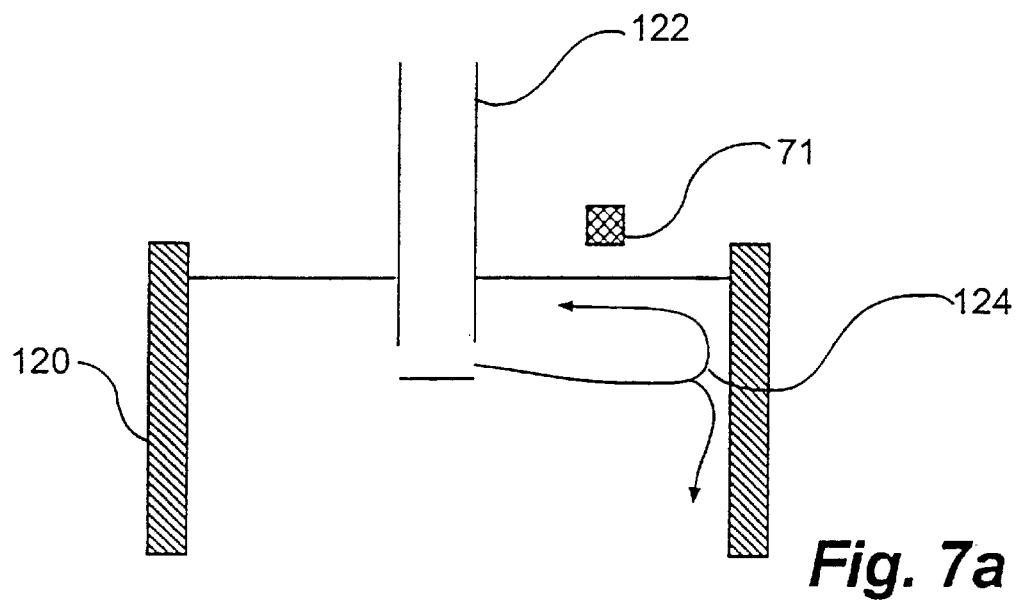
FIGS. 7a–b show an application of a device according to the present invention in the form of a simplified sketch.
Figure 7B:
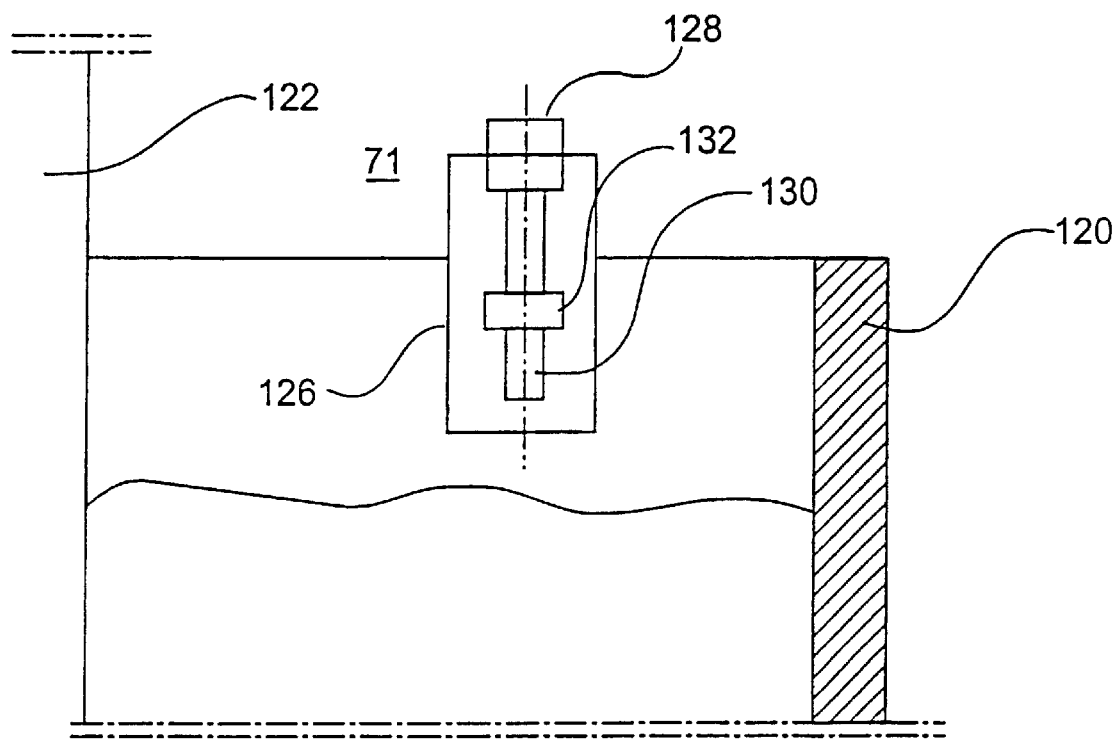

FIG. 7a schematically shows a chill mould 120 in cross-section in which molten metal flows. The metal is supplied to the chill mould 120 from a submerged entry nozzle 122 which is arranged vertically in the middle of the chill mould 120 and whose lower end is formed with outlet holes, through which the metal flows into the chill mould 120, currents of metal arising as the arrows 124 show schematically in the figure. A device 71 according to the present invention is placed above the chill mould 120. FIG. 7b shows a cut-out magnified image of the device 71, which in this very simplified, illustrative form comprises an elongated, cylindrical casing 126 of non-magnetic material. The upper end of the casing 126 is attached to a holder 128 so that a vertical attachment is obtained. The casing 126 encloses, as in the examples above, some sort of magnet which generates a magnetic field and sensors 130 for detecting the resulting counterforce. Apart from the sensor 130, which in this case is adapted to measure the speed and direction of motion of the metal, also a distance sensor 132 is arranged. Since the size of the counterforce depends on the distance between the device 71 and the molten metal, the distance sensor 132 is arranged to measure this distance and keep it constant by means of positioning equipment that is controlled by a regulator and connected to the holder. Thus, the correct measuring values of the speed and the direction of motion are ensured. The distance sensor 132 is previously known and preferably comprises one or more electromagnetic coils, the inductances of which are related to the distance. A block diagram which comprises a distance sensor will be described in connection with FIG. 9.

Figure 8:
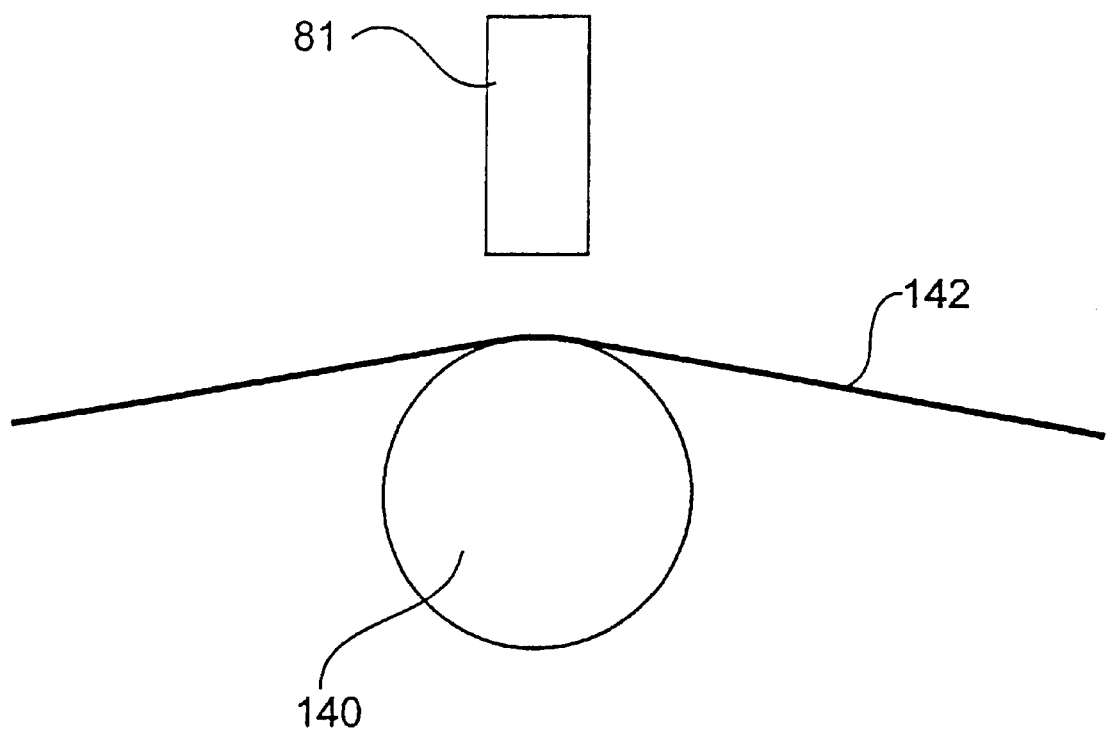
FIG. 8 shows another application of a device according to the present invention in the form of a simplified sketch.

Very schematically, FIG. 8 shows another application of the present invention. In processing lines, for example rolling mills, it may be important to determine the speed of a metal bed with a high degree of accuracy. In this case, it is thus not a matter of a molten metal but of a solid one, in the form of a metal band 142 which runs over a deflecting roller 140. A device 81 according to the invention which is placed above the metal band 142 and the deflecting roller 140, is conveniently designed according to one of the embodiments described above.

Figure 9:
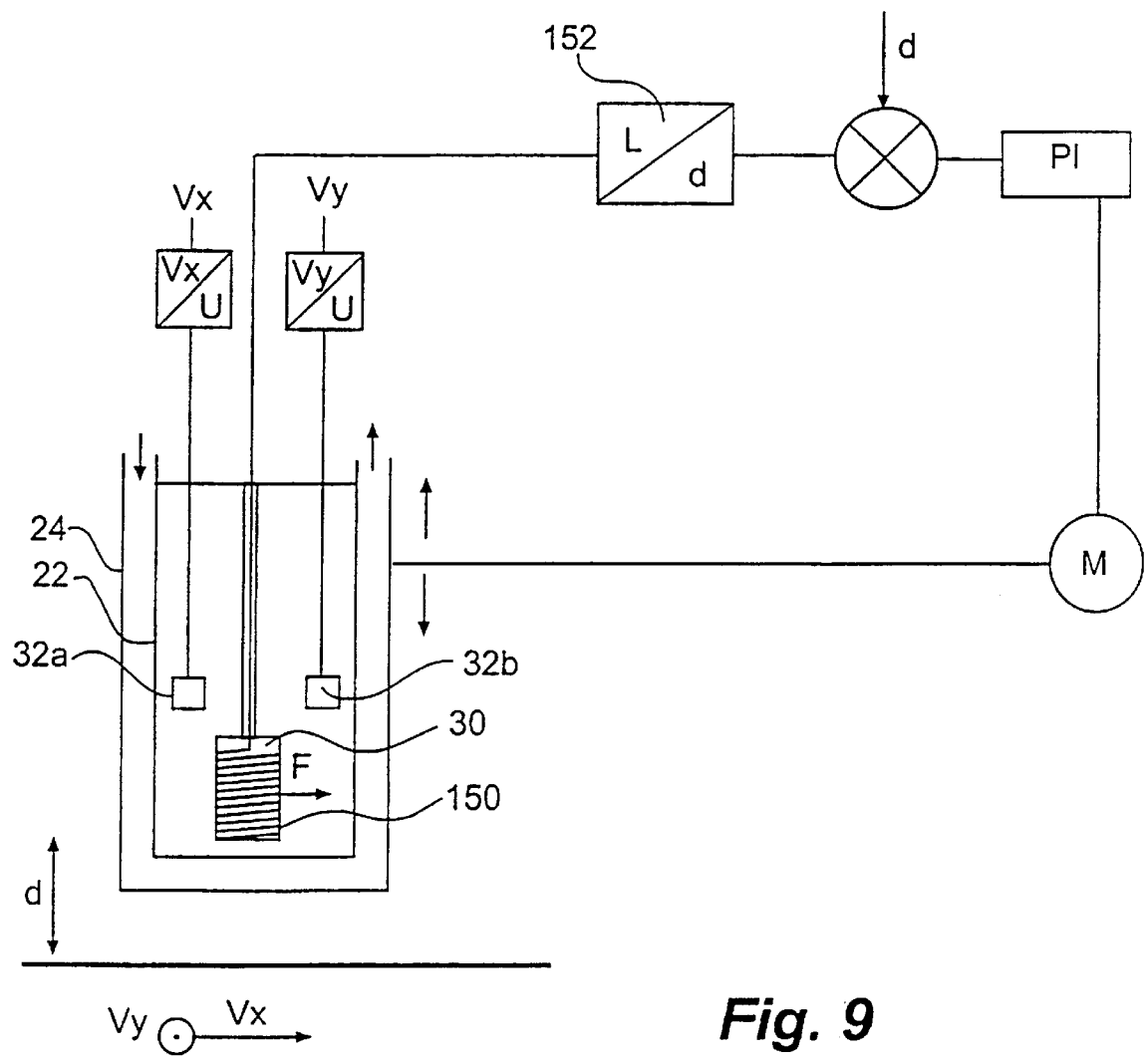
FIG. 9 shows an exemplifying block diagram of the measuring of the speed and the direction of motion of a metal bed and the keeping of the distance between the metal bed and the device according to an embodiment of the present invention constant.

FIG. 9 shows an exemplifying block diagram of an example of measuring of the speed and direction of motion of a metal bed and keeping the distance between the metal bed and the device constant. The block diagram represents especially the embodiment which has been shown in connection with the FIGS. 3a–b. The casings 22, 24 of the device enclose the magnet 30 which is suspended by a pendulum and two sensors in the form of Hall sensors 32a,b for measuring in two directions which are perpendicular to one another in the horizontal plane, the directions being named X-direction and Y-direction, respectively. When the position of the magnet 30 is changed, the magnetic field through the Hall sensors 32a,b will be changed and thus also the difference of potential (Hall voltage) across the same. The voltage is converted to speed by means of previously calibrated values or calibration equipment. Subsequently, linearisation may occur.

The signal processing does not in itself constitute a part of the invention, but is of such type that those skilled in the art can take suitable measures. Because of this, no particular stress has been put on describing the signal processing, which thus has only been illustrated schematically in the example above.

The magnet 30 is enclosed by an inductor 150 which is connected to an inductive transducer 152. The transducer 152 gives an output signal which is related to the distance between the device and the metal bed, the output signal being compared with a distance reference valued, after which feedback is provided by a PI-controller PI, which controls positioning equipment by means of a motor M. The positioning equipment thus raises or lowers the device, so that the distance to the metal bed corresponds to the predetermined distance reference value.

An alternative to the above-mentioned is to not indude the magnet 30 in the device, but only use the inductor 150. The inductor 150 is then fed with alternating current for measuring the distance to the metal bed according to prior-art technique. Besides, the inductor 150 is fed with direct current for generating eddy currents in the metal bed when it moves relative to the inductor 150, an action of the force on the inductor 150 being obtained in the same manner as on the magnet 30 according to what has been mentioned above. It is, of course, not necessary to use direct current for generating eddy currents. For instance, it is also possible to use alternating current, the frequency of which differs from the frequency of the alternating current which is fed to the distance measurement.

What is claimed is:

1. A method for contactless measuring of at least one parameter of a metal bed, the method comprising the steps of:

generating a magnetic field on only one side of a metal bed;

making at least one of the metal bed and the magnetic field move relative to one another so that eddy currents are generated in the metal bed and induce a force;

subjecting interacting means arranged proximate to the metal bed to the force;

measuring the force on the interacting means; and determining the parameter of the metal bed, the parameter being a function of the force.

2. A method as claimed in claim 1, wherein the interacting means is arranged on only one side of the metal bed.

3. A method as claimed in claim 1, wherein the magnetic field is generated such that the magnetic field is directed towards the metal bed.

4. A method as claimed in claim 1, wherein a main direction of the magnetic field and a direction of the force form a substantially right angle.

5. A method as claimed in claim 1, wherein the parameter is an eddy-affecting parameter.

6. A method as claimed in claim 1, wherein the force is measured by detecting movement, caused by the force, of the interacting means.

7. A method as claimed in claim 1, wherein the force is measured by detecting material stress in the interacting means caused by the force.

8. A method as claimed in claim 1, wherein the force is measured by detecting a magnitude of movement of the interacting means caused by the force.

9. method as claimed in claim 8, wherein the detected movement is a pendulum motion.

10. A method as claimed in claim 8, wherein the detected movement is a rotary motion.

11. A method as claimed in claim 1, wherein the interacting means floats in a medium with a higher density than air.

12. A method as claimed in claim 1, wherein a distance between the interacting means and the metal bed is controlled so that the distance corresponds to predetermined distance reference values.

13. A device for contactless measuring of at least one parameter of a metal bed, the device comprising means for generating a magnetic field so that eddy currents are generated in a metal bed and induce a force as at least one of the metal bed and the first means move relative to each other;

interacting means arranged so that they are affected by the force; and measuring means adapted to measure the force acting on the interacting means, a parameter of the metal bed that is sought to be measured being a function of the force, wherein the generating means is adapted to generate the magnetic field from only one side of the metal bed.

14. A device as claimed in claim 13, wherein the interacting means is arranged on only one side of the metal bed.

15. A device as claimed in claim 13, wherein the device measures the at least one parameter from only one side of the metal bed.

16. A device as claimed in claim 13, wherein the generating means is arranged so that the generated magnetic field is directed towards the metal bed.

17. A device as claimed in claim 13, wherein a main direction of the generated magnetic field and a direction of the force form a substantially right angle.

18. A device as claimed in claim 13, wherein the parameter sought to be measured is an eddy-current affecting parameter.

19. A device as claimed in claim 13, wherein the generating means and the interacting means comprise part of a single unit.

20. A device as claimed in claim 13, wherein the interacting means includes a body which is movable in response to the force.

21. A device as claimed in claim 13, wherein the interacting means includes a fixed body and the measuring means detects mechanical stress caused by the force in the fixed body, the mechanical stress being a function of the force.

22. A device as claimed in claim 13, wherein the interacting means includes a movable body that moves in response to the force, and measuring means detects motions of the movable body which are caused by the force.

23. A device as claimed in claim 22, wherein the movable body is a suspended pendulum that swings as a function of the force and the measuring means measures a swing of the pendulum.

24. A device as claimed in claim 22, wherein the movable body is rotatable and rotates in response to the force and the measuring means measures an amount of rotation of the movable body.

25. A device as claimed in claim 24, wherein the movable body is a turnable wheel adapted to turn so as to rotate in a direction of motion of a moving one of the at least one of the metal bed and the generating means.

26. A device as claimed in claim 13, wherein the interacting means floats in a medium with a higher density than air.

27. A device as claimed in claim 13, further comprising distance-controlling means for controlling a distance between the device and the metal bed.

28. A method as claimed in claim 1, wherein the force is measured by detecting a direction of movement of the interacting means caused by the force.

29. A method as claimed in claim 1, wherein the force is substantially parallel to a surface of the metal bed.

30. A method as claimed in claim 1, wherein the parameter is at least one of speed of motion, direction of motion, distance, thickness, and conductivity of the metal bed.

31. A device as claimed in claim 13, wherein the force is substantially parallel to a surface of the metal bed.

32. A device as claimed in claim 13, wherein the parameter is at least one of speed of motion, direction of motion, distance, thickness, and conductivity of the metal bed.

* * * * *